United States Patent [19]

Kusaka et al.

[11] Patent Number: 5,076,675
[45] Date of Patent: Dec. 31, 1991

[54] POLARIZING SEPARATING DEVICE AND OPTICAL ISOLATOR EMPLOYING THE SAME

[75] Inventors: Satoshi Kusaka, Kawasaki; Hideki Noda, Inagi; Tatsuro Kunikane, Yokohama; Kiyoshi Terai, Tokyo; Hironao Hakogi, Kawasaki, all of Japan

[73] Assignee: Fujitsu Limited, Kawasaki, Japan

[21] Appl. No.: 432,728

[22] PCT Filed: Feb. 22, 1989

[86] PCT No.: PCT/JP89/00177

§ 371 Date: Oct. 26, 1989

§ 102(e) Date: Oct. 26, 1989

[87] PCT Pub. No.: WO89/08278

PCT Pub. Date: Sep. 8, 1989

[30] Foreign Application Priority Data

Feb. 26, 1988 [JP] Japan .................. 63-044743
Mar. 25, 1988 [JP] Japan .................. 63-072640
Apr. 8, 1988 [JP] Japan .................. 63-087631
Apr. 8, 1988 [JP] Japan .................. 63-087632

[51] Int. Cl.⁵ .................. G02B 5/30; G02B 27/28; G02F 1/09
[52] U.S. Cl. .................. 359/484; 359/488; 359/589
[58] Field of Search .................. 350/394, 402, 166, 395, 350/375, 376, 378

[56] References Cited

U.S. PATENT DOCUMENTS 4,553,822 11/1985 Mahlein .................. 350/394
4,641,926 2/1987 Shirasaki .................. 350/394
4,725,109 2/1988 Wank et al. .................. 350/166
4,770,505 9/1988 Okazaki .................. 350/394
4,854,670 8/1989 Mellor .................. 350/166
4,900,137 2/1990 Carter .................. 350/166
4,931,315 6/1990 Mellor .................. 350/166

FOREIGN PATENT DOCUMENTS 52-38942 3/1977 Japan .................. 350/395
58-71714 5/1983 Japan .
58-132722 8/1983 Japan .................. 350/394
59-201026 11/1984 Japan .................. 350/402
60-118803 6/1985 Japan .
60-238813 11/1985 Japan .................. 350/395
62-50811 8/1986 Japan .
61-186903 8/1986 Japan .
63-298203 12/1988 Japan .................. 350/394
64-48019 2/1989 Japan .................. 350/402

Primary Examiner—Bruce Y. Arnold
Assistant Examiner—Martin Lerner
Attorney, Agent, or Firm—Staas & Halsey

[57] ABSTRACT

A device which includes a polarizer wherein one of a pair of transmission faces of a transparent substrate by a light beam on which a polarizing separating film is not formed is formed in an inclined relationship with respect to the other transmission face of the transparent substrate on which the polarizing separating film is formed and a parallel light beam having a predetermined incident angle with respect to the polarizing separating film is passed through the polarizing separating film to effect polarized light separation. Two such devices are provided and a Faraday rotator is provided between the two devices to constitute an optical isolator.

15 Claims, 14 Drawing Sheets

POLARIZING SEPARATING DEVICE AND OPTICAL ISOLATOR EMPLOYING THE SAME

DESCRIPTION

1. Technical Field

This invention relates to a polarizing separating device employing a polarizer of the open construction and an optical isolator employing such polarizing separating device, and more particularly to a polarizing separating device which is wide in wavelength band with which an extinction ratio higher than a predetermined level can be obtained and besides is suitable in reduction in overall size thereof and to an optical isolator employing such polarizing separating device.

2. Background Art

Generally, in an optical communication system which employs optical fibers as a transmission path, light introduced into an optical fiber from a light source is sometimes reflected at a junction between adjacent optical fibers and partly returns to the light source. If such reflected returning light takes place, then where the light source is a semiconductor laser (for example, a semiconductor laser of the distribution feedback type which is superior in spectrum characteristic), operation of the light source becomes unstable, and the transmission quality is deteriorated. Accordingly, an optical isolator which can allow transmission of light only in a forward direction is required.

A polarizer which forms a common component of optical devices such as an optical isolator and an optical switch has a function to separate polarized light (linearly polarized light) from non-polarized light or to separate polarized light into two polarized light components having planes of polarization orthogonal to each other. Such polarizers are roughly separated, from their constructions, into two types including a type wherein a birefringent crystal of rutile (monocrystal of $TiO_2$) is used to effect polarizing separation based on a difference in refractive index between a normal light component and an abnormal light component of light passing therethrough and another type wherein an interference film such as a dielectric multilayer film is used to reflect and transmit different polarized components to effect polarizing separation. Of the two types, a polarizer of the type which is constructed using an interference film (polarizing separating film) has a greater separation angle, which is advantageous in construction of an optical device such as an optical isolator. Accordingly, polarizers of the latter type are employed widely.

When it is intended to construct a polarizing separating device using a polarizing separating film, it is common to construct a polarizer of the short construction wherein a polarizing separating film is put on the opposite sides thereof between a pair of transparent substrates in order to assure a high extinction ratio (crosstalk) and assure a wide wavelength band of light with which an extinction ratio higher than a predetermined level can be obtained. However, since the short construction requires at least two transparent substrates, the device obtained has a comparatively large overall size and is complicated in construction. In this regard, a polarizer of the open construction wherein a polarizing separating film is directly exposed to the air is advantageous because it requires only one transparent substrate. However, in order to assure a wide wavelength band of light with which an extinction ratio higher than a predetermined level can be obtained using a polarizer of the open construction, it is necessary to set the incident angle of light to the polarizer to a large angle of, for example, 70 degrees or so. Accordingly, depending upon a diameter of a light beam, the polarizer must have a large size, which is accompanied by a large overall size of the device.

SUMMARY OF THE INVENTION

Accordingly, it is an object of the present invention to provide a polarizing separating device wherein the wavelength band with which an extinction ratio higher than a predetermined level can be obtained is wide.

It is another object of the present invention to provide a polarizing separating device which assures a wide wavelength band of light with which an extinction ratio higher than a predetermined level can be obtained and besides is suitable in reduction in overall size and also to reduce the overall size of an optical device such as an optical isolator which is constructed using such polarizing separating device.

According to one aspect of the present invention, a polarizing separating device wherein a transparent substrate and a polarizing separating film formed on a surface of the transparent substrate are passed by a parallel light beam having a predetermined incident angle with respect to the polarizing separating film to effect polarized light separation is constituted such that it comprises a polarizer wherein, of transmission faces of the transparent substrate by the parallel light beam, the transmission face on the side on which the polarizing separating film is formed in an inclined relationship with respect to the other transmission face on which the polarizing separating film is not formed.

Preferably, the polarizing separating film is composed of a plural odd number of layers including a plurality of odd-numbered $SiO_2$ layers and a plurality of even-numbered $TiO_2$ layers, and where the wavelength of the light beam is $\lambda$, the thickness of the first layer which directly contacts with the transparent substrate and the uppermost layer farthest from the transparent substrate is set to a value from $\lambda/20$ to $\lambda/8$ while the center layer is set to a value from $3\lambda/8$ to $5\lambda/8$. The incident angle of light to the polarizing separating film is set to about 70 degrees.

According to another aspect of the present invention, there is provided a polarizing separating device which employs a polarizer wherein $SiO_2$ layers and $TiO_2$ layers are layered in an alternate relationship on a transparent substrate, which is constituted such that each odd-numbered layer is formed from $SiO_2$ while each even-numbered layer is formed from $TiO_2$ to form a multilayer film including an odd number of layers as a whole, and where the wavelength of light is $\lambda$, the thickness of the first layer which directly contacts with the transparent substrate and the thickness of the uppermost layer farthest from the transparent substrate are set to a value or values between $\lambda/20$ and $\lambda/8$ while the thickness of the center layer is set to a value between $3\lambda/8$ to $5\lambda/8$.

Preferably, the incident angle of light to the polarizing separating film is a value ranging from 65 degrees to 75 degrees, and where the wavelength of light is $\lambda$, the thickness or thicknesses of the layers other than the first layer, uppermost layer and center layer range from $3\lambda/20$ to $\lambda/4$.

According to a further aspect of the present invention, there is provided an optical isolator which includes a Faraday rotator and a light transmission path side polarizer in this order on an optical axis, which is constituted such that the light transmission path side polarizer includes a polarizing separating film formed on a transparent substrate on the side of the Faraday rotator, and a face of the transparent substrate on the side on which the polarizing separating film is not formed is formed in an inclined relationship with respect to a face of the transparent substrate on the side on which the polarizing separating film is formed.

Preferably, the polarization plane of light from a light source makes an angle of 45 degrees with respect to the polarization plane of light which passes through the light transmission path side polarizer such that the light from the light source may be optically rotated by the Faraday rotator and pass through the light transmission path side polarizer.

A light source side polarizer having the same construction as the light transmission path side polarizer may be provided on the opposite side of the light transmission path side polarizer with respect to the Faraday rotator.

In this instance, preferably the polarization plane of light which passes through the light source side polarizer makes an angle of 45 degrees with respect to the polarization plane of light which passes through the light transmission path side polarizer.

BEST MODE FOR CARRYING OUT THE INVENTION

Figure 1:
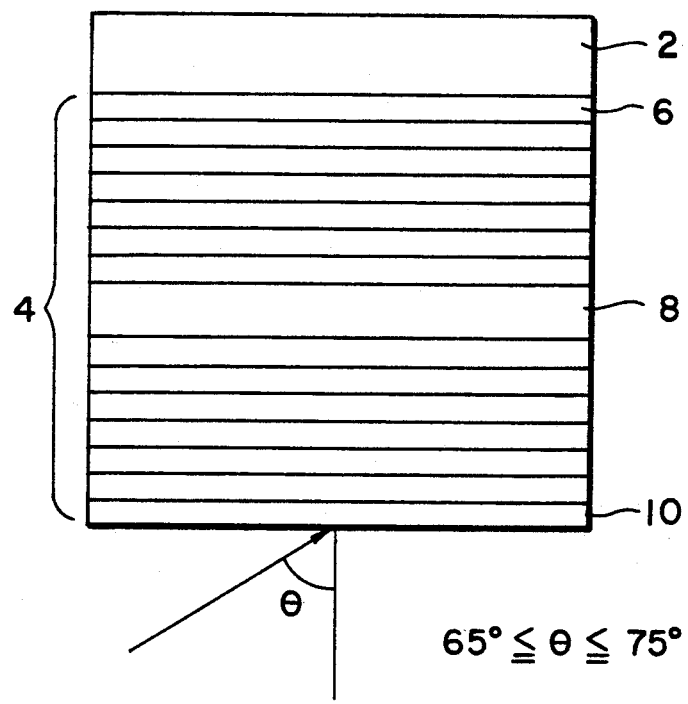
FIG. 1 is a view showing a basic layer structure of a polarizing separating film which can be used in reduction of the present invention to practice.

In the following, the present invention will be described in detail in connection with preferred embodiments thereof shown in the drawings.

A basic layer structure of a polarizing separating film which can be used in reduction of the present invention to practice will be described with reference to FIG. 1. Referring to FIG. 1, reference numeral 2 denotes a transparent substrate which is transparent with regard to light to be polarized and separated, and the transparent substrate 2 is made of, for example, glass (BK-7) having a refractive index of 1.50. A plural odd number of dielectric layers are formed on the transparent substrate 2 to make a polarizing separating film 4. In the polarizing separating film 4, the odd-numbered layers are made of $SiO_2$ while the even-numbered layers are made of $TiO_2$, and the $SiO_2$ layers and the $TiO_2$ layers are layered in an alternate relationship. Where the wavelength of light to be polarized and separated is represented by $\lambda$, the thickness of the first layer 6 which contacts directly with the transparent substrate 2 and the uppermost layer 10 farthest from the transparent substrate 2 ranges from $\lambda/20$ to $\lambda/8$ while the thickness of the center layer 8 ranges $3\lambda/8$ to $5\lambda/8$. Further, the incident angle of light to the polarizing separating film 3 constructed in this manner is set to 65 to 75 degrees.

As the polarizing separating film has such an open construction as described above, construction of a polarizer can be simplified comparing with a polarizing separating film of the short construction, and reduction in overall size of a polarizer or a polarizing separating device can be attained. As the thickness of each layer forming the polarizing separating film 4 is optimized, the extinction ratio, for example, of a P wave can be improved. Further, since the odd-numbered layers are formed from SiO₂ while the even-numbered layers are formed from TiO₂, ripples (pulsations), for example, of the P wave can be minimized over a wide band. Besides, since the incident angle of light to be polarized and separated is set to a great angle of 65 to 75 degrees, the band within which a predetermined extinction ratio can be obtained is widened.

A desirable layer structure of a polarizing separating film which can be used in reduction of the present invention to practice will be described with reference to FIG. 2. A polarizing separating film 4 is formed on a transparent substrate 2 by vapor deposition of alternate 27 layers of SiO₂ and TiO₂ using, for example, an electron beam vapor depositing method such that each odd-numbered layer as counted from a layer which directly contacts with the transparent substrate 2 is formed from SiO₂ while each even-numbered layer is formed from TiO₂. The refraction index of SiO₂ is 1.45 while the refraction index of TiO₂ is 2.25. The reason why each odd-numbered layer is formed from SiO₂ while each even-numbered layer is formed from TiO₂ is that it is intended to minimize ripples (pulsations) of the P waves over a wide band width. Further, in order to obtain a high extinction ratio of the P waves, where one fourth of the wavelength λ of incident light is equal to 1.0, the thickness of each layer is optimized in the following manner.

(1) 1st and 27th layers = 0.4
(2) 2nd layer = 0.6
(3) 3rd layer = 0.75
(4) 4th to 11th layers = 1.0
(5) 12th layer = 0.8
(6) 13th and 15th layers = 1.0
(7) 14th (center) layer = 1.6
(8) 16th layer = 0.85
(9) 17th to 26th layers = 1.0

Figure 3:
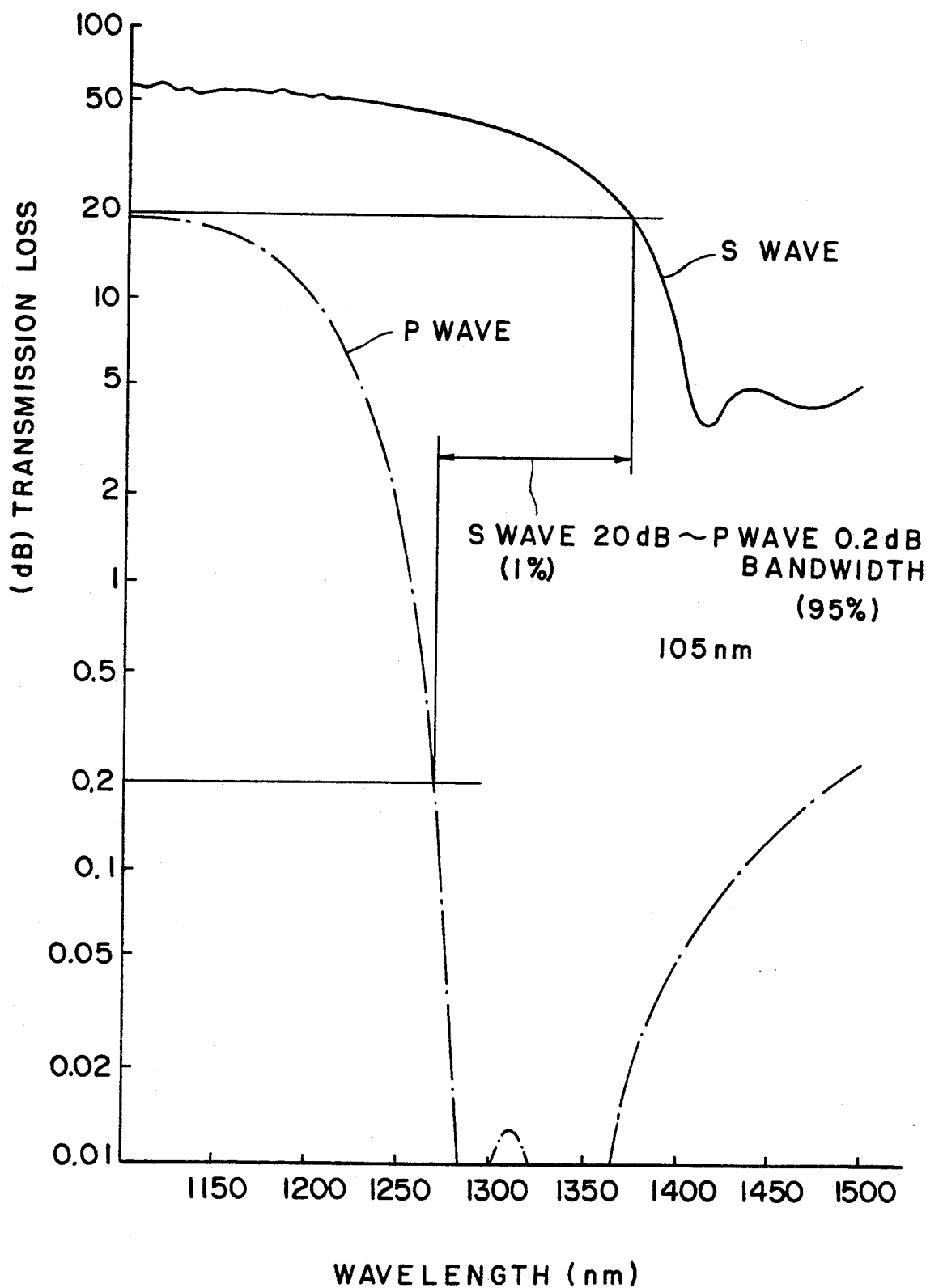
FIG. 3 is a graph illustrating a relationship between a transmission loss (dB) and a wavelength of light (nm) when the incident angle of light to the polarizing separating film of FIG. 2 is 71 degrees.

A relationship between a transmission loss (dB) and a wavelength of light (nm) where the incident angle of light to the polarizing separating film is set to 70 degrees will be described with reference to FIG. 3. Referring to FIG. 3, the band width wherein the transmission loss of the P wave is lower than 0.2 dB (transmissivity is higher than 95%) and the transmission loss of the S wave is higher than 20 dB (transmissivity is lower than 1%) is 105 nm. Here, the P wave is polarized light having a polarization plane parallel to the incident plane while the S wave is polarized light having a polarization plane perpendicular to the incident plane.

Figure 4:
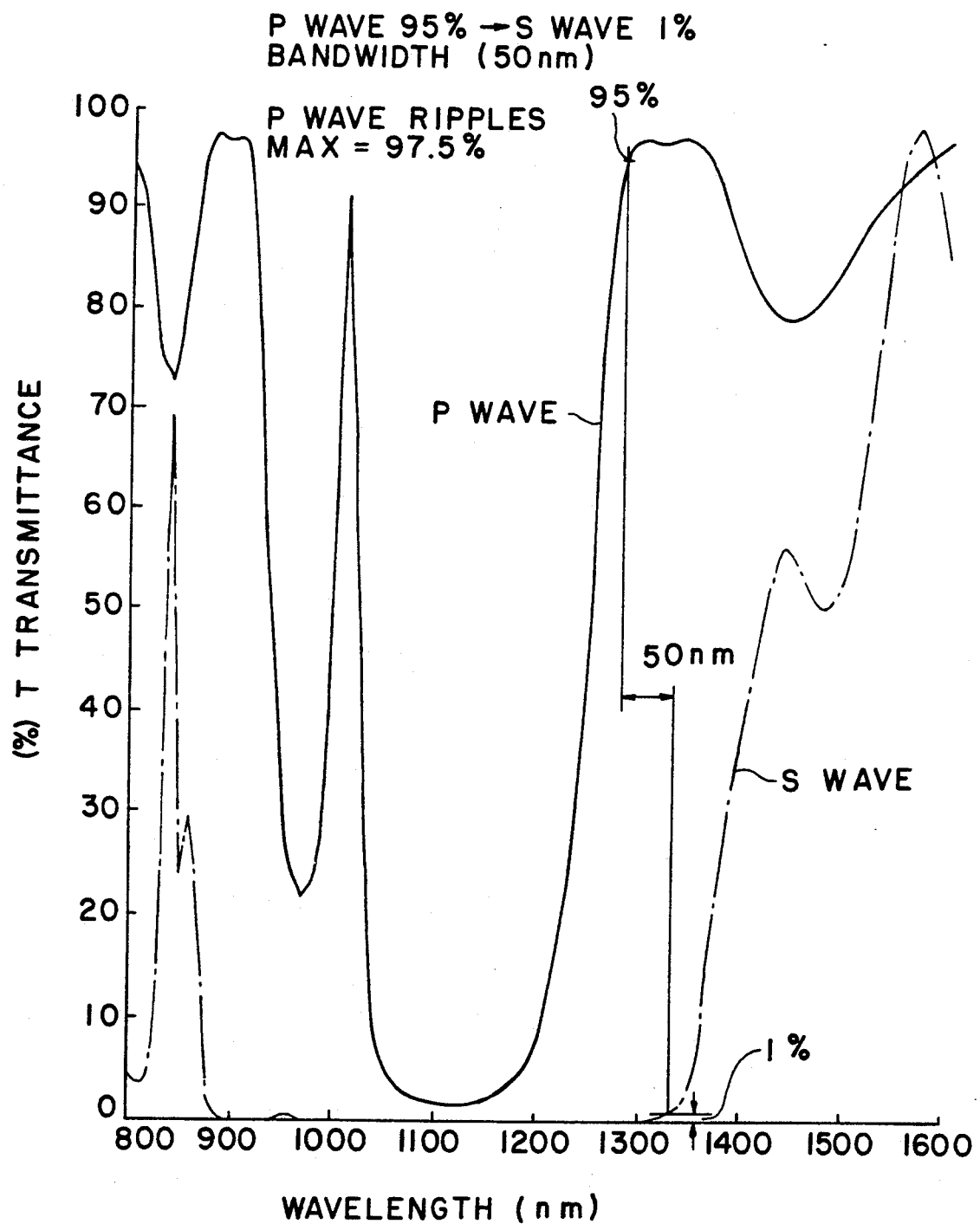
FIG. 4 is a graph illustrating a relationship between a transmission loss (dB) and a wavelength of light (nm) in the case of a conventional polarizing separating film for explaining the superiority of the polarizing separating film of FIG. 2.

The superiority of the band characteristic of the polarizing separating film will be described with reference to FIG. 4. FIG. 4 is a graph showing a relationship between a transmission loss (%) and a wavelength of light (nm) in an exemplary one of conventional polarizing separating films. The conventional polarizing separating film is constituted such that a dielectric multilayer film including 23 layers is formed on a transparent substrate made of glass such that, where the wavelength λ of light to be polarized and separated is set equal to 1.0, the thickness of the first and 23rd layers is set to 0.5, the thickness of the 12th layer or center layer is set to 1.5 and the thickness of the other layers is all set to 1.0. In FIG. 4, results of measurement where the incident angle θ is set to 70 degrees are shown. As can be apparently seen from FIG. 4, in the case of the conventional polarizing separating film, the band width wherein the transmissivity of the P wave is higher than 95% and the transmissivity of the S wave is lower than 1% is about 50 nm.

Figure 2:
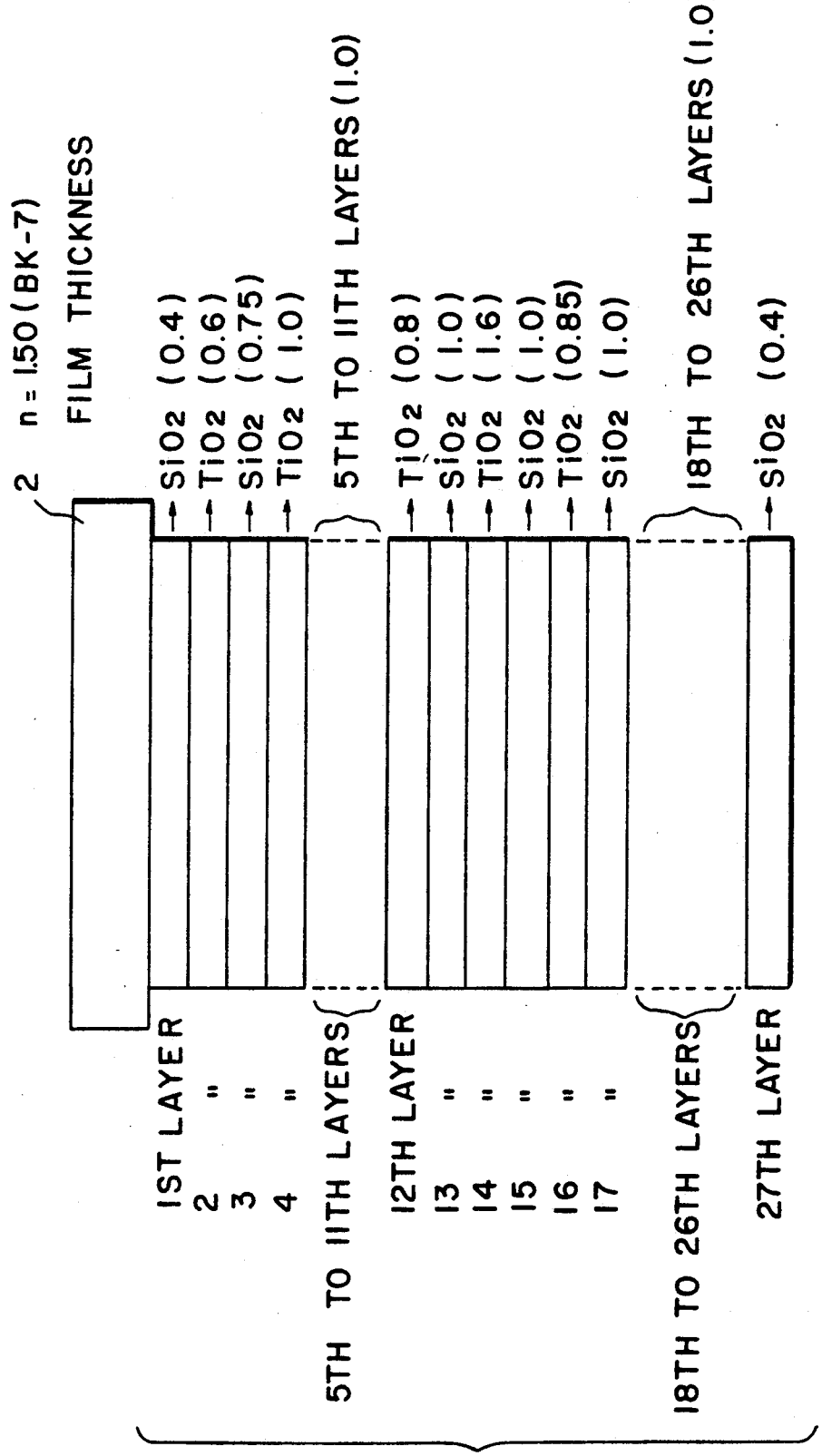
FIG. 2 is a view showing a desirable layer structure of a polarizing separating film which can be used in reduction of the present invention to practice.

In this manner, as can be apparently seen from FIGS. 3 and 4, with the construction of the polarizing separating film of FIG. 2, the wavelength band with which an extinction ratio higher than a predetermined level can be obtained can be made about twice comparing with the conventional polarizing separating film.

Figure 5:
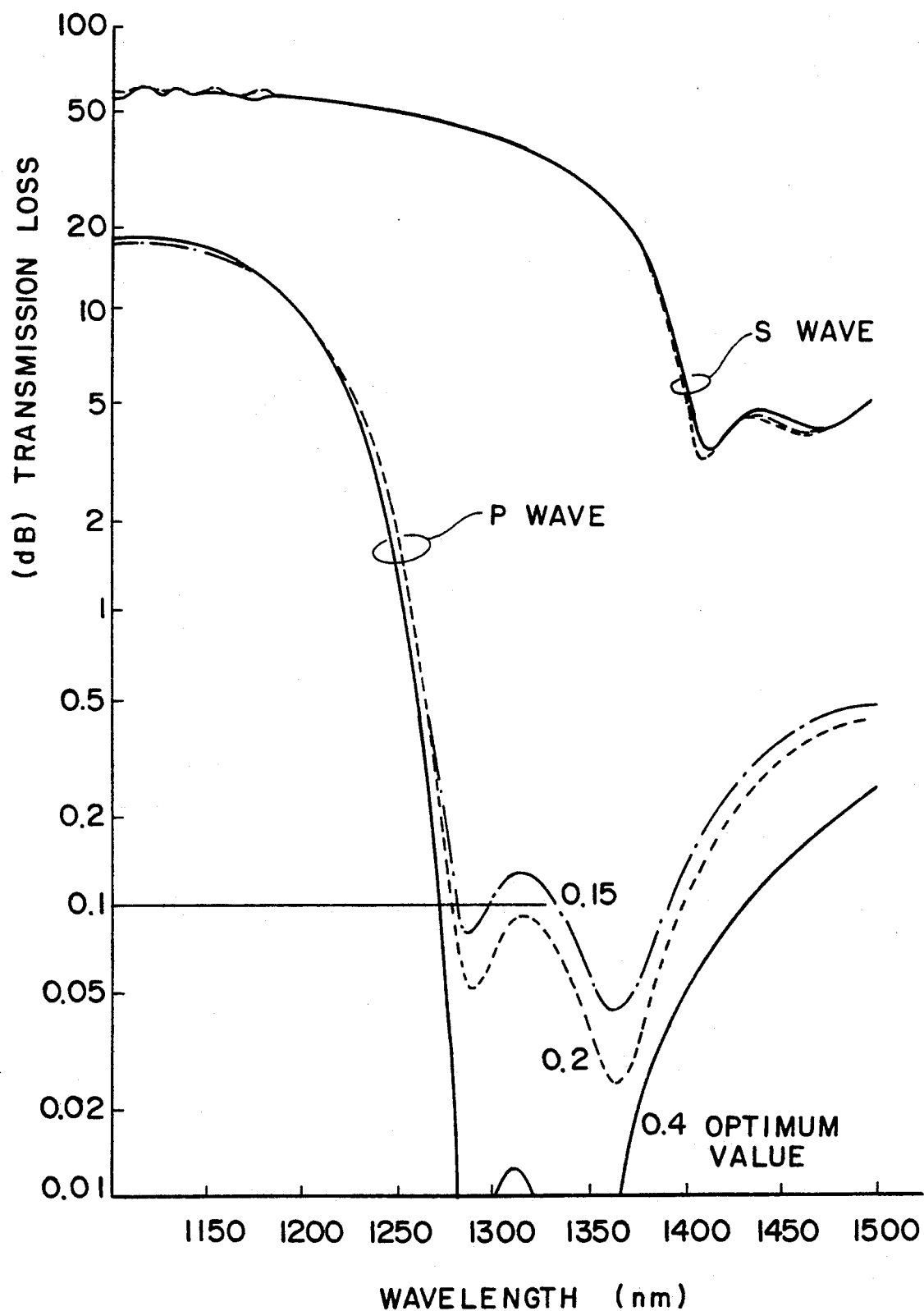
FIG. 5 is a graph illustrating a relationship between a transmission loss (dB) and a wavelength of light (nm) in the case of the polarizing separating film of FIG. 2 wherein the thickness of the first and 27th layers is set to a value smaller than 0.4 (optimum value)
Figure 6:
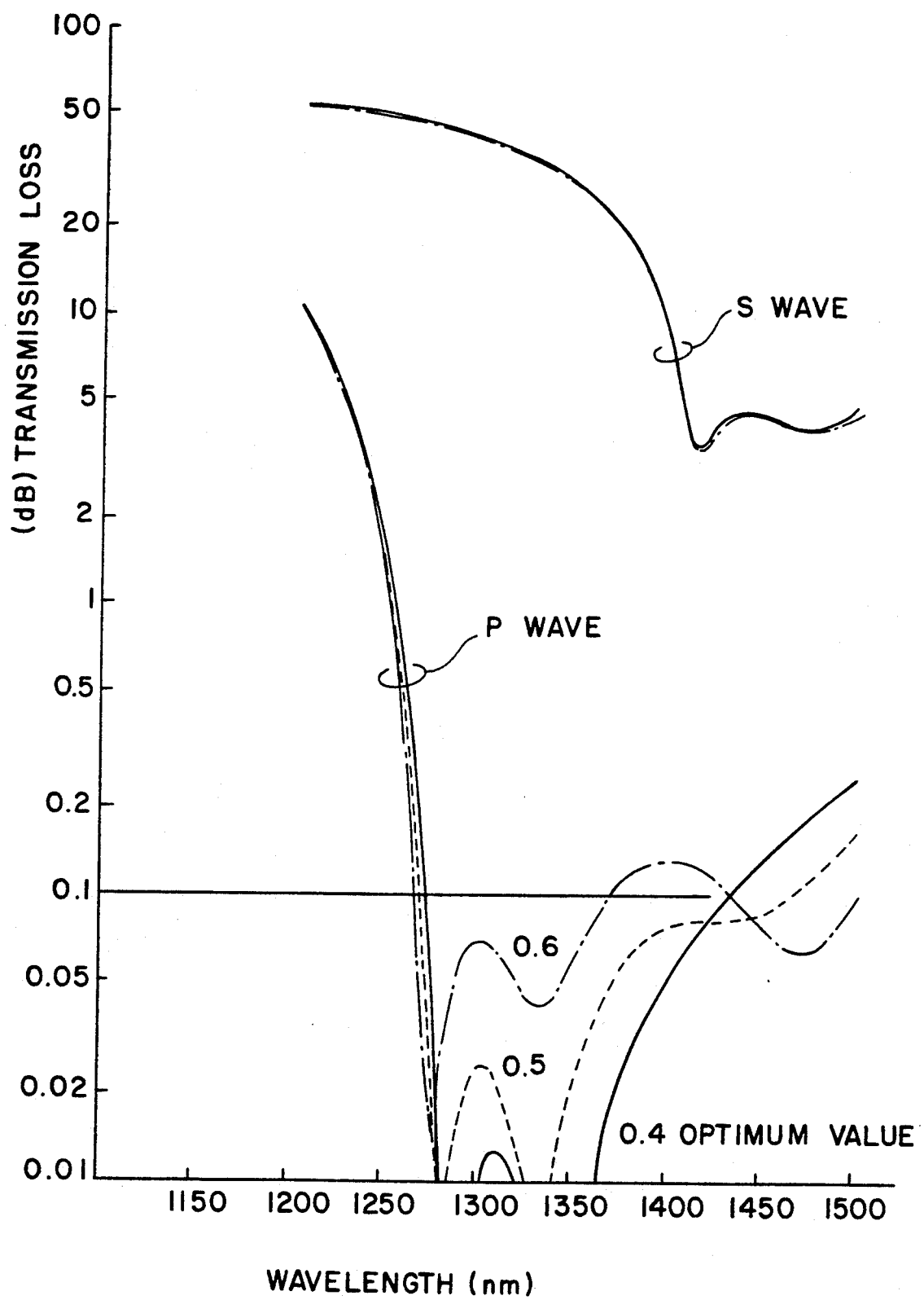
FIG. 6 is a graph illustrating a relationship between a transmission loss (dB) and a wavelength of light (nm) in the case of the polarizing separating film of FIG. 2 wherein the thickness of the first and 27th layers is set to a value greater than 0.4 (optimum value)
Figure 7:
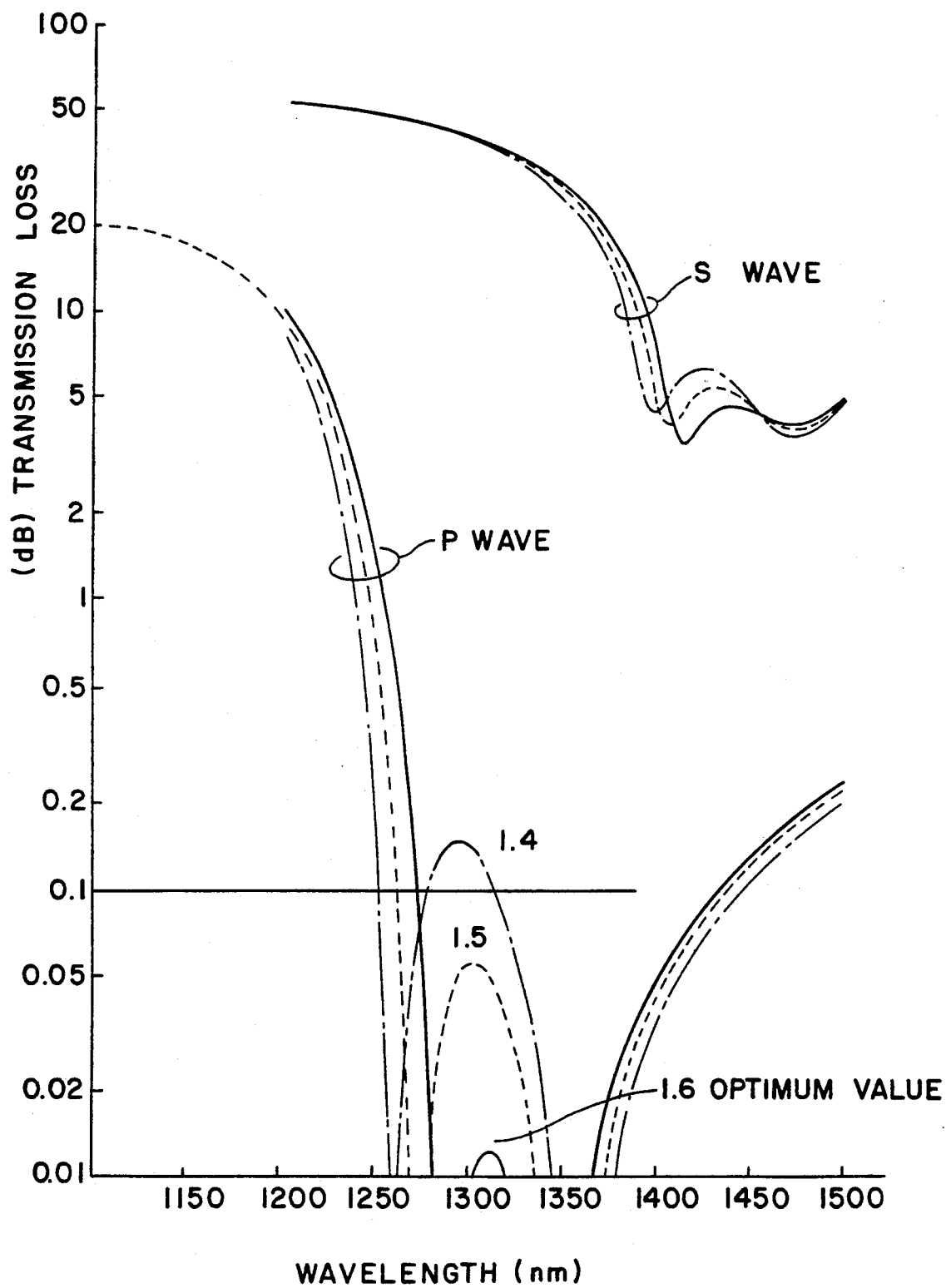
FIG. 7 is a graph illustrating a relationship between a transmission loss (dB) and a wavelength of light (nm) in the case of the polarizing separating film of FIG. 2 wherein the thickness of the 14th layer is set to a value smaller than 1.6 (optimum value)
Figure 8:
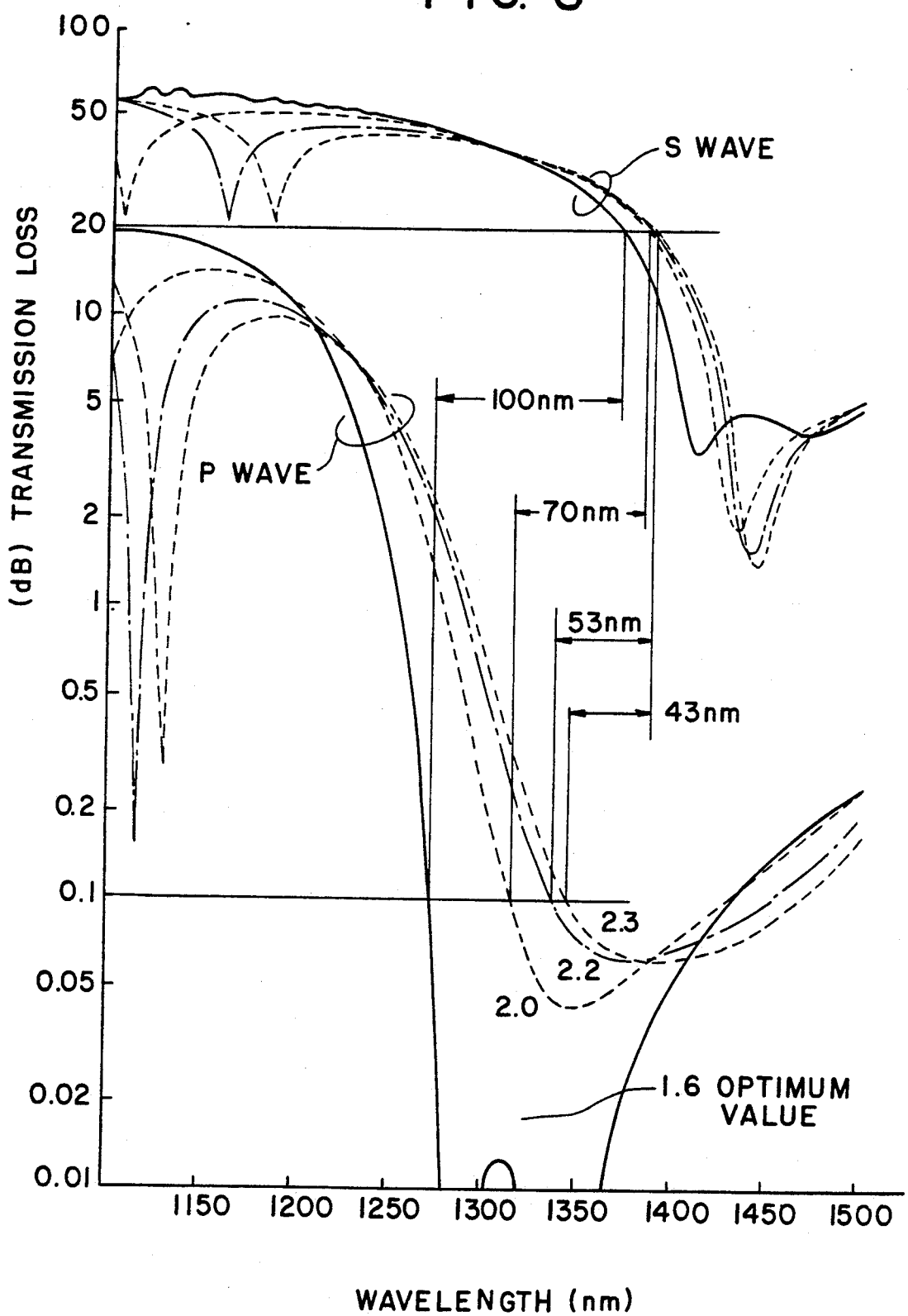
FIG. 8 is a graph illustrating a relationship between a transmission loss (dB) and a wavelength of light (nm) in the case of the polarizing separating film of FIG. 2 wherein the thickness of the 14th layer is set to a value greater than 1.6 (optimum value)

A desirable range of the thickness of the first and 27th layers will be described with reference to FIGS. 5 and 6. FIG. 5 is a graph showing a relationship between a transmission loss (dB) and a wavelength (nm) where the thicknesses of the first and 27th layers are changed to 0.2 and 0.15, respectively, while the other conditions are maintained, in an overlapping relationship with the graph of FIG. 3 wherein the thickness of the first and 27th layers is set to the optimum value equal to 0.4. On the other hand, FIG. 6 is a graph showing a relationship where the thicknesses of the first and 27th layers are changed to 0.5 and 0.6, respectively, in a similar manner. Where the thicknesses of the first and 27th layers are 0.15 and 0.6, respectively, the transmission loss in a wavelength suitable for use presents a value greater than 0.1 dB. Accordingly, in case it is intended to provide an optical isolator wherein the loss, for example, in a forward direction is small, it is desirable to set the thicknesses of the first and 27th layers within the range of 0.2 to 0.5. FIG. 7 shows graphs illustrating relationships where the thickness of the 14th layer (center layer) is set to 1.5 and 1.4 in a similar manner as in FIG. 5. FIG. 8 shows graphs illustrating relationships where the thickness of the 14th layer is set to 2.0, 2.2 and 2.3 in a similar manner. From the graphs shown in FIG. 7, it can be apparently seen that it is desirable to set the thickness of the 14th layer to a value greater than 1.5 in order to reduce the loss in a forward direction. Further, from the graphs shown in FIG. 8, it can be apparently seen that it is desirable to set the thickness of the 14th layer to a value smaller than 2.2 in order to assure a wide band width wherein the transmission loss of the P wave is smaller than 0.1 dB and the transmission loss of the S wave is 20 dB, for example, to assure a band width greater than 50 nm. Accordingly, the desirable range in thickness of the first and 27th layers is λ/20 to λ/8 while the desirable range in thickness of the 14th layer is 3λ/8 to 5λ/8. It is to be noted that, since the transmission loss of the P wave of light having the wavelength of 1300 nm or around it is 0.1 dB where the thickness of the first and 27th layers is set to about 0.6, where such a light source is employed, even if the thickness of the first and 27th layers is set to a value greater than 0.5, the polarizing separating film will sufficiently stand for practical use.

Figure 9:
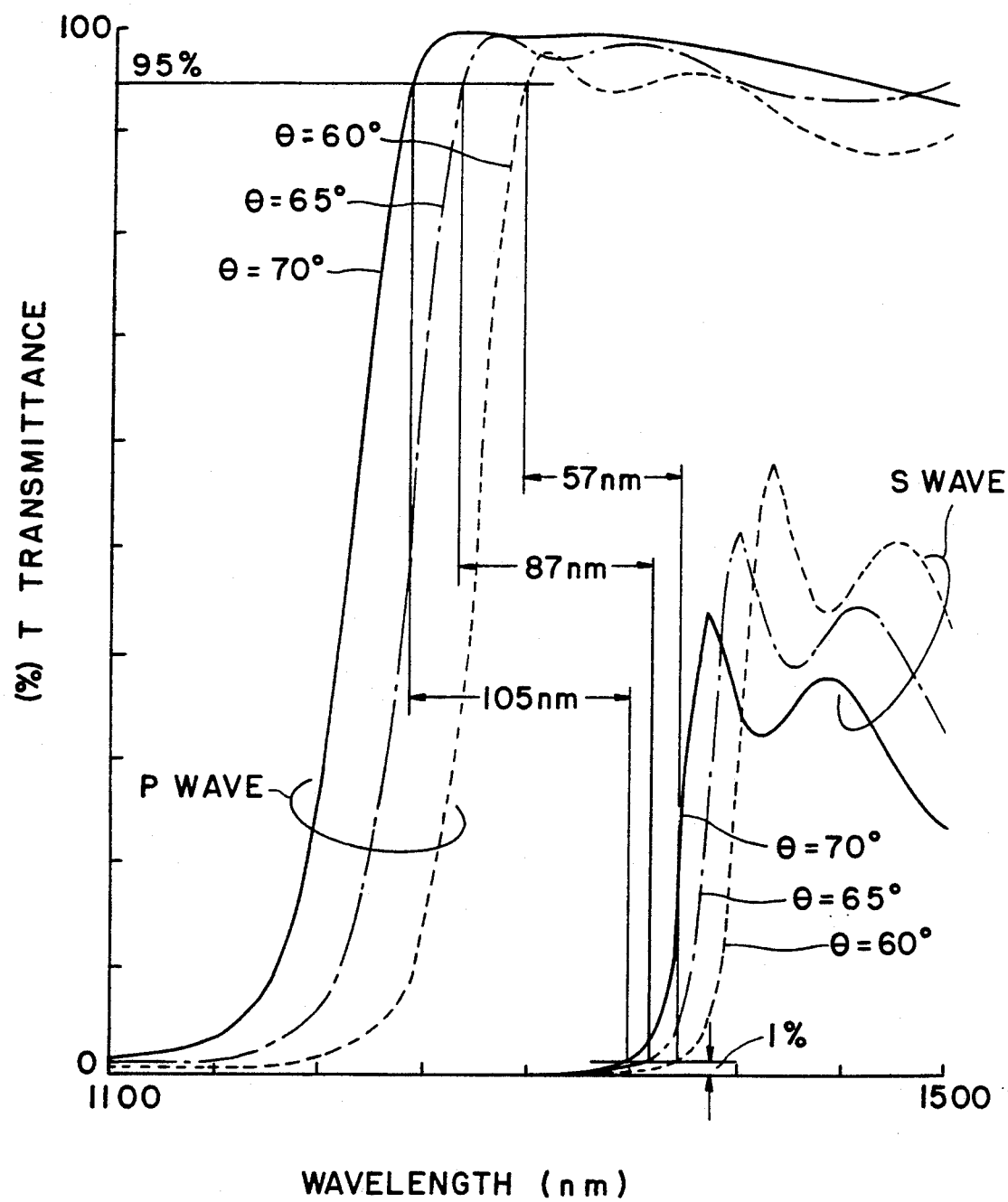
FIG. 9 is a graph illustrating a relationship between a transmissivity (%) and a wavelength of light (nm) when the incident angle of light to the polarizing separating film of FIG. 2 is varied.

A desirable range of the incident angle will be described with reference to FIG. 9. FIG. 9 is a graph showing a relationship between a transmissivity (%) and a wavelength of light (nm) when the incident angle of light to the polarizing separating film shown in FIG. 2 is varied. The band width wherein the transmissivity of the P wave is greater than 95% and the transmissivity of the S wave is smaller than 1% is 57 nm at an incident angle of 60 degrees, 87 nm at 65 degrees, and 105 nm at 70 degrees, and it can be seen that the band width increases as the incident angle increases. Where the incident angle $\theta$ is 60 degrees, the band width does not present a significant improvement comparing with that of the conventional polarizing separating film, and accordingly, it is desirable to set the incident angle to a value greater than 65 degrees. To the contrary, if the incident angle is increased beyond 70 degrees, the band width can be increased theoretically, but it is difficult in practical use to set the incident angle to a value greater than 75 degrees, it is desirable to set the incident angle to a value smaller than 75 degrees.

Figure 10:
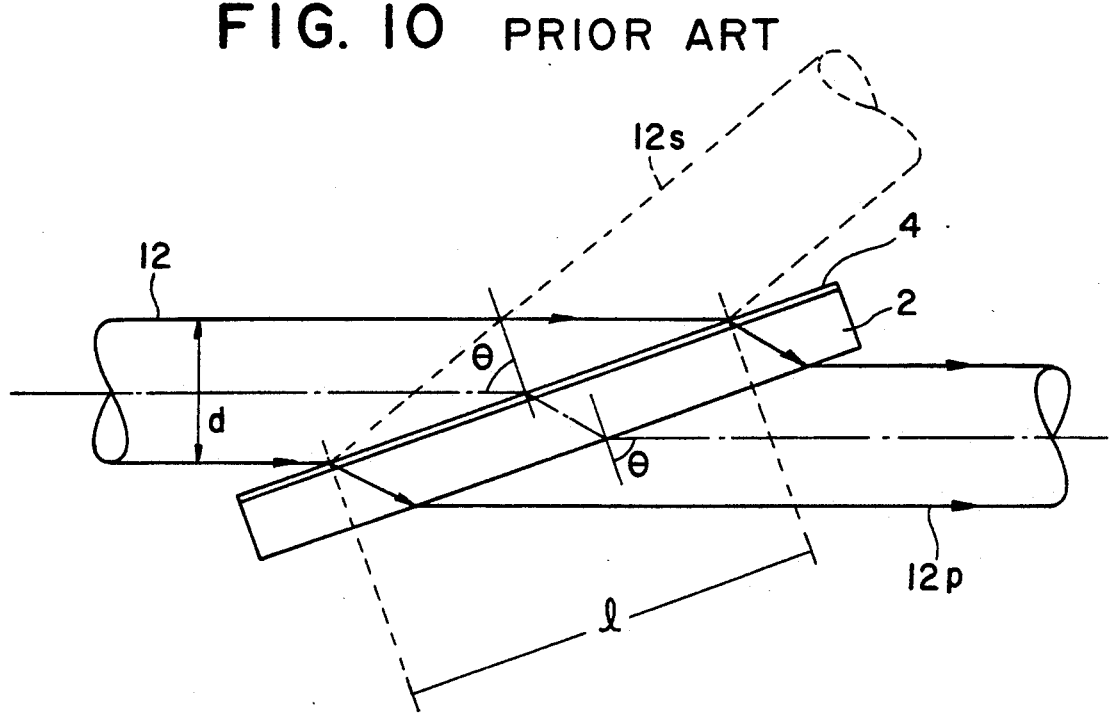
FIG. 10 is a view showing a manner wherein a necessary area of a polarizing separating film is increased when the incident angle is set to a comparatively great angle where a traditional polarizer of the open construction is employed.

While the band with which an extinction ratio higher than a predetermined level may be obtained can be widened by utilization of a polarizer of the open construction in this manner, there is a disadvantage that the necessary area of a polarizing separating film is increased in order to set the incident angle to a comparatively great angle of 65 to 75 degrees in practical application. This will be described with reference to FIG. 10. FIG. 10 is a view showing a traditional structure of a polarizer of the open construction. The polarizer is constructed such that a polarizing separating film 4 such as a dielectric multilayer film is formed on a transparent substrate 2 such as a flat glass plate, and as light is introduced from the side, for example, of the polarizing separating film 4 into the polarizer at an incident angle $\theta$ suitable for a wavelength of light to be used, the device functions as a polarizer. If, for example, a parallel light beam 12 wherein a bundle of rays has a cylindrical shape is introduced into the polarizer at an incident angle $\theta$, a P wave component 12p of the polarizing separating film 4 having a polarization plane parallel to the plane of the figure passes through the polarizing separating film 4 and the transparent substrate 2 in this order. Meanwhile, an S wave component 12s of the polarizing separating film 4 having a polarization plane perpendicular to the plane of the figure is reflected by the polarizing separating film 4. Consequently, the polarized lights are separated from each other.

If the incident angle of light to the polarizer is set to a comparatively large angle (for example, to $\theta = 70$ degrees) in order to assure a good band characteristic, the minimum length l of the polarizing separating film 4 on the plane of the figure which is necessitated to irradiate a beam of light upon the polarizing separating film 4 in the figure is given, using a diameter d of the parallel light beam 12, by $$l = d/\cos 70° = 2.92 \times d$$

and accordingly, the polarizing separating film is required to have a length about three times the beam diameter. Therefore, in order to obtain a good band characteristic using the polarizer of the open construction, it is necessary to increase the area on which the polarizing separating film is formed. Consequently, the polarizer becomes large in size and requires a high production cost of the polarizing separating film. In this manner, in the case of the traditional structure of a polarizer, it is necessary to select one of the alternatives that an increase in overall size of a device and a rise in production cost are allowed to increase the band width and that a small band width is allowed to attain reduction of the overall size of the device and reduction of the production cost. It is to be noted that, in the case of the polarizer shown in the figure, since the transparent substrate 2 and the polarizing separating film 4 extend in parallel to each other, the incident angle of light from the outside to the polarizing separating film 4 on the side on which the polarizing separating film 4 is formed coincides with the incident angle from the outside to the transparent substrate 2 on the other side on which the polarizing separating film 4 is not formed. One of the incident angles is called emergent angle where the propagating direction of light is limited to one direction, but in the present specification, they are both referred to as incident angle without distinguishing them because the polarizer can achieve a function of a polarizer even if light is propagated in either direction therein.

Figure 11:
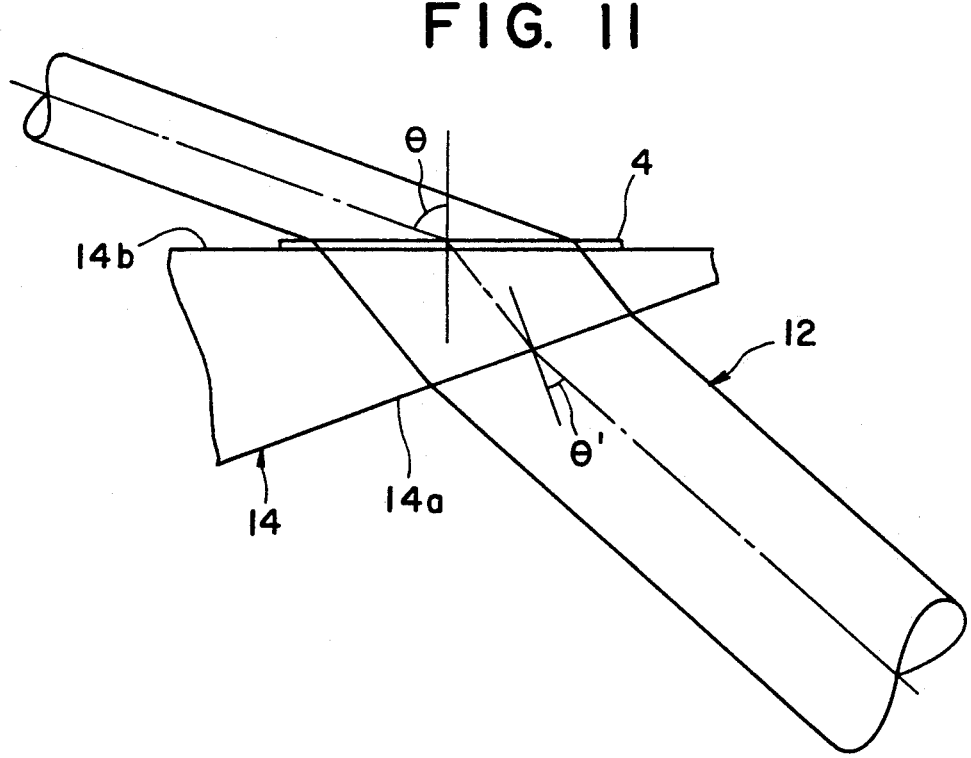
FIG. 11 is a view showing a manner wherein a necessary area of a polarizing separating film is not increased very much when the incident angle is set to a comparatively great angle where a polarizing separating device of an embodiment of the present invention is employed.

It will be described with reference to FIG. 11 that the necessary area of a polarizing separating film is not increased very much in the embodiment of the present invention even if the incident angle is set to a comparatively great value. The polarizer is constructed such that a parallel light beam 12 having a predetermined incident angle with respect to the polarizing separating film 4 is passed through the transparent substrate 14 and the polarizing separating film 4 formed on a surface of the transparent substrate 14 to effect polarized light separation. Further, of a pair of transmission faces of the parallel light beam 12 at the transparent substrate 14, the transmission face 14a on the side on which the polarizing separating film 4 is not formed is formed in an inclined relationship with respect to the other transmission face 14b on the other side on which the polarizing separating film 4 is formed. In case the incident angle of light from the outside to the polarizing separating film 4 on the side on which the polarizing separating film 4 is formed is equal to $\theta$ similarly as in FIG. 10, the incident angle $\theta'$ of light from the outside to the transparent substrate 14 on the side on which the polarizing separating film 4 is not formed is smaller than $\theta$, that is, $\theta' < \theta$, because the transmission faces 14a and 14b are formed in an inclined relationship to each other. Accordingly, if the beam shape of the parallel light beam 12 on the side on which the polarizing separating film 4 is not formed is made the same as the beam shape of the parallel light beam of FIG. 10, then the minimum length (area) of the polarizing separating film 4 necessary for the polarizing separating film 4 to allow the parallel light beam 12 to pass therethrough is smaller than the length (area) necessitated in the case of FIG. 10. It is to be noted that, since the incident angle on the side on which the polarizing separating film 4 is formed is equal in both of FIGS. 10 and 11, a great band width is assured in both cases. Further, the reason why a parallel light beam is employed in the present invention is that it is intended to fix the incident angle of light ray elements forming the light beam with respect to the polarizing separating film 4 to prevent the extinction ratio from being differentiated for individual light ray elements.

Figure 12:
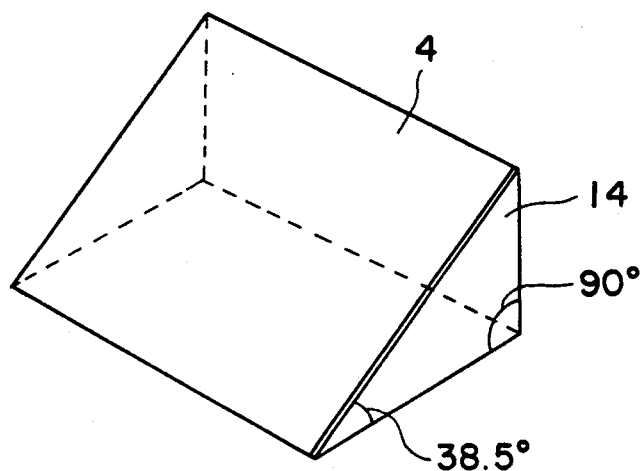
FIG. 12 is a perspective view of a polarizing separating device showing a preferable embodiment of the present invention.

FIG. 12 is a perspective view of a polarizer showing a preferred embodiment of the present invention. In the case of the present polarizer, a glass prism having a triangular pole configuration is used as a transparent substrate 14. The glass prism is made of BK-7 having a refractive index of 1.51, and two of the three interior angles of the triangle formed on a side face of the glass prism is 90 degrees and 38.5 degrees. Further, a film of such construction as shown in FIG. 2 is employed as a polarizing separating film 4.

Figure 13:
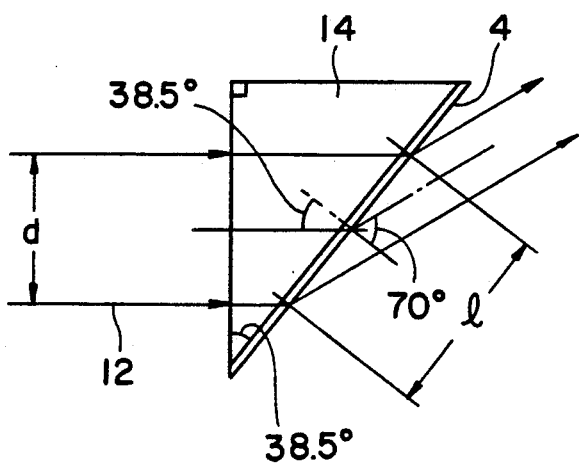
FIG. 13 is a view showing a geometrical relationship between a polarizer and a parallel beam of light where a polarizing separating device is constructed using the polarizer of FIG. 12.

FIG. 13 is a view showing a geometrical relationship between a polarizer and a parallel light beam where a polarizing separating device is constructed using the polarizer shown in FIG. 12. Now, if it is assumed that the polarizer is disposed in the air (refractive index=1.0) and the incident angle (actually an emergent angle or an angle of refraction) of a parallel light beam passing through the polarizer on the side of the air with respect to the polarizing separating film 4 is set to 70 degrees, the incident angle on the transparent substrate 4 side with respect to the polarizing separating film 4 is 38.5 degrees from Snell's law. Since in the present polarizing separating device an edge angle of the transparent substrate 14 is set to 38.5 degrees, the minimum length l of the polarizing separating film 4 necessary for a parallel light beam having a beam diameter d is given by $$l = d/\cos 38.5° = 1.28 \times d$$

and the polarizing separating film may only have a length of one half to one third that of the conventional polarizing separating film.

Figure 14:
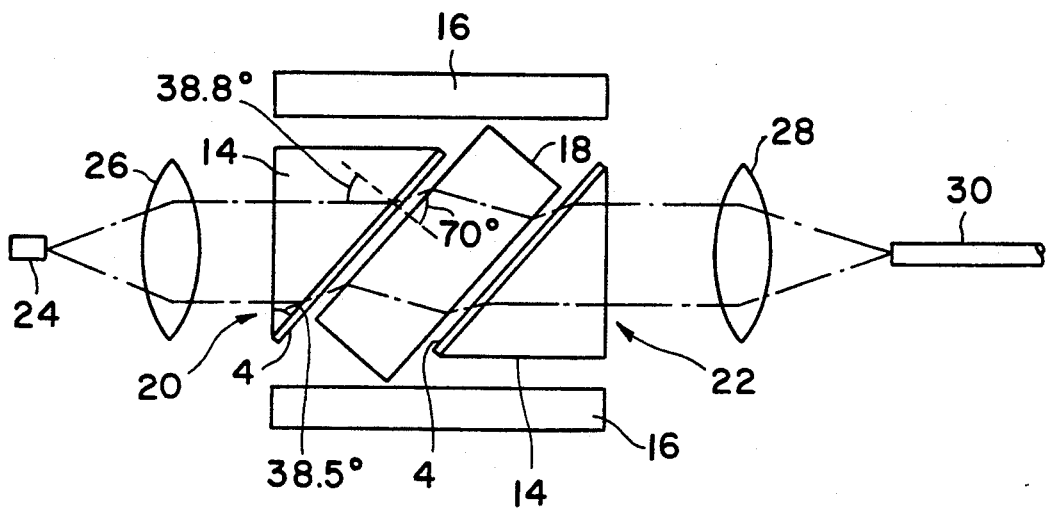
FIG. 14 is a view showing a basic construction of an optical isolator which is constructed using the polarizer of FIG. 12.

FIG. 14 is a view showing a basic construction of an optical isolator which is constructed using the polarizer shown in FIG. 12. The optical isolator is constituted such that a Faraday rotator 18 having a function to always make Faraday rotation (optical rotation) in one direction under application of a magnetic field of a predetermined strength (for example, a saturation magnetic field) by a permanent magnet 16 while a light source side polarizer 20 and a light transmission path side polarizer 22 are disposed forwardly and rearwardly of the Faraday rotator 18 in such a positional relationship that the light source side polarizer 20 and the light transmission path side polarizer 22 are rotated by 45 degrees relative to each other. The Faraday rotator 18, for example, of a disk-like configuration is disposed such that it may be inclined by a predetermined angle with respect to an optical axis in order to eliminate an influence of light reflected by a surface thereof. It is to be noted that, in the optical isolator shown in FIG. 14, the light source side polarizer 20 and the light transmission path side polarizer 22 are shown in such a positional relationship that they are not rotated relative to each other in order to assure the clarity in illustration. Light emitted from a semiconductor laser or laser diode 24 serving as a light source is converted into a parallel light beam by a collimator lens 26, and only polarized light components having a polarization plane in a particular direction passes through the light source side polarizer 20 while the other components are reflected by the light source side polarizer 20 and thus removed. Polarized light having passed through the light source side polarizer 20 emerges from the Faraday rotator 18 after the polarization plane thereof has been rotated by 45 degrees. The polarized light having the polarization plane rotated by 45 degrees then passes through the light transmission path side polarizer 22 and is then condensed by another lens 28 whereafter it is introduced into an optical fiber 30 serving as a light tranmisssion path. On the other hand, in the case of light which has been reflected by a connecting end face not shown of the optical fiber or the like and has propagated in the opposite direction in the optical fiber 30, only such polarized light as having a polarization plane rotated by 45 degrees with respect to the light source side polarizer 20 is passed through the light transmission path side polarizer 22. The polarized light having passed through the light transmission side polarizer 22 emerges from the Faraday rotator 18 after it has been rotated by 45 degrees in the opposite direction to that of light in the forward direction with respect to the propagating direction. Accordingly, the polarized light having a polarization plane rotated by 90 degrees with respect to the polarization plane of polarized light which passes through light source side polarizer 20 emerges from the Faraday rotator 18. Accordingly, the polarized light is reflected and removed by the light source side polarizer 20.

Figure 15:
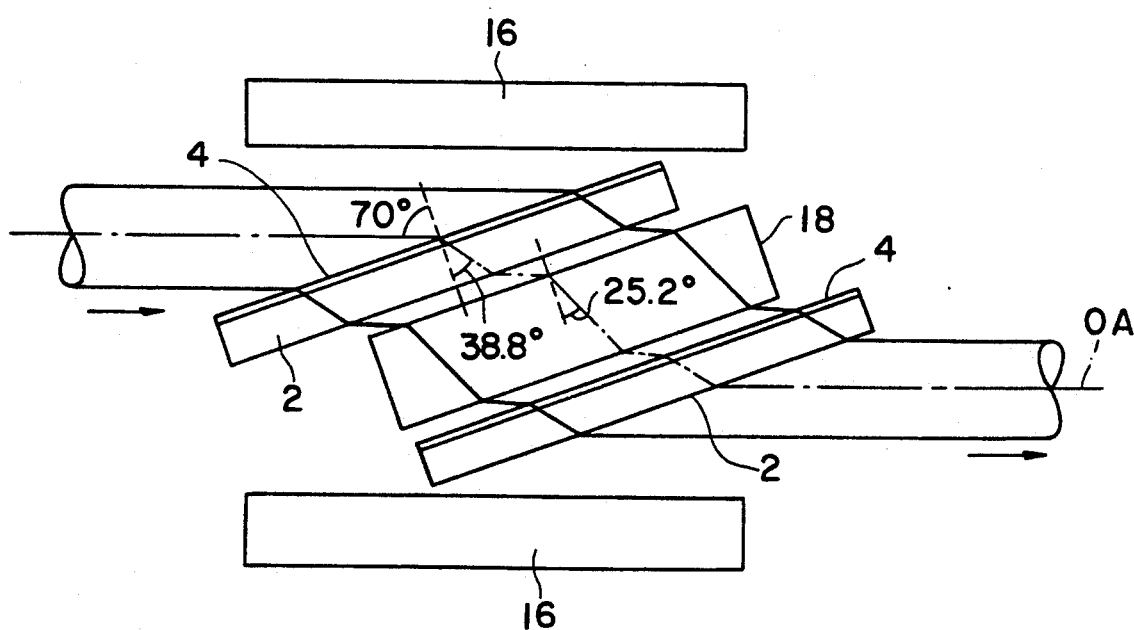
FIG. 15 is a view showing a traditional optical isolator for explaining the superiority of the optical isolator of FIG. 14.

The superiority of the optical isolator shown in FIG. 14 will be described with reference to FIG. 15. FIG. 15 is a view showing an optical isolator constructed using such a traditional polarizer as, for example, shown in FIG. 10. In the case of the optical isolator shown in FIG. 15, since the incident angle of light to the polarizing separating film 4 is set to 70 degrees in order to increase the available wavelength range of a light source, that is, to improve the band characteristic, the device is increased in length in the direction of an optical axis OA. To the contrary, in the case of the optical isolator of the present invention shown in FIG. 14, the light source side polarizer 20 and the light transmission path side polarizer 22 can be reduced in size in accordance with the principle described hereinabove with reference to FIG. 13, and consequently, the Faraday rotator 18 and the permanent magnet 16 can be reduced in size. Accordingly, an optical isolator of a small size having a good band characteristic can be provided.

Figure 16:
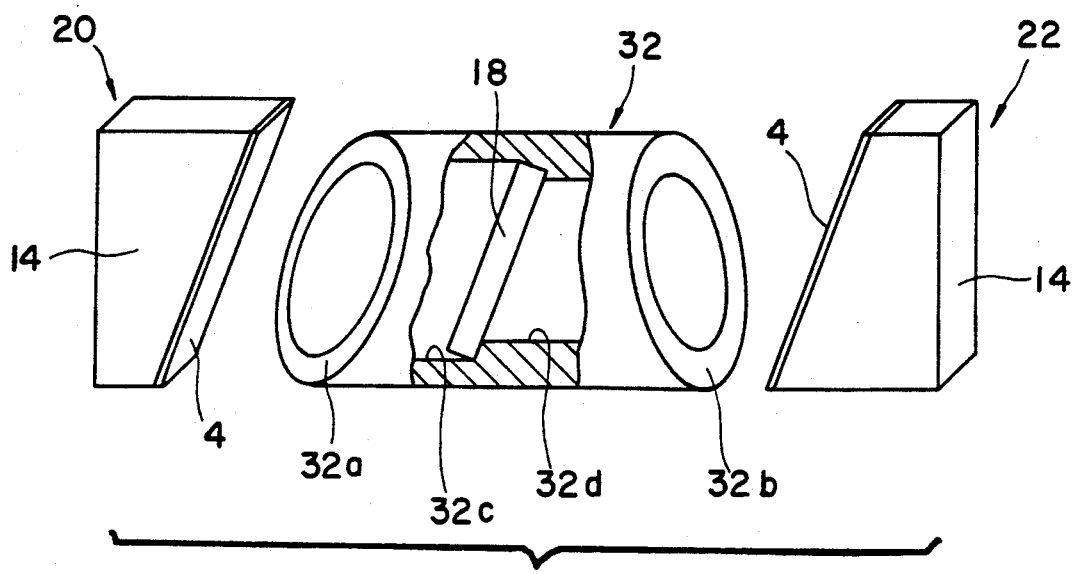
FIG. 16 is an exploded perspective view of an optical isolator for explaining means for fixedly holding components of the optical isolator of FIG. 14 in a predetermined positional relationship.
Figure 17:
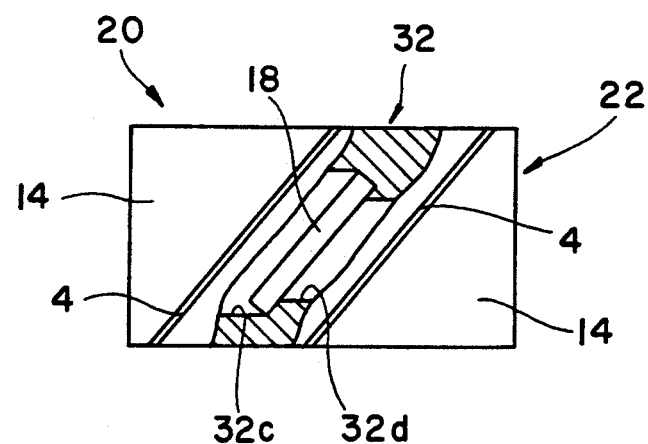
FIG. 17 is a partial sectional side elevational view of the optical isolator of FIG. 16 after assembly.

Means for fixedly holding the components of the optical isolator shown in FIG. 14 in a predetermined positional relationship will be described with reference to FIGS. 16 and 17. In the device shown, a wedge-shaped portion of each of the light source side polarizer 20 and the light transmission path side polarizer 22 is cut off, and the polarizers 20 and 22 are secured to the opposite end faces 32a and 32b of a cylindrical member 32. A large diameter hollow portion 32c and a small diameter hollow portion 32d are formed in the inside of the cylindrical member 32, and the Faraday rotator 18 which is formed by working a rod of YIG (yttrium/iron-garnet) or the like into a disk-like configuration is seated at a stepped portion between the large diameter hollow portion 32c and the small diameter hollow portion 32d. As the Faraday rotator 18 is fixedly held in the inside of the cylindrical member 32 and the polarizers 20 and 22 are secured to the openings at the opposite ends of the cylindrical member 32, the individual optical elements can be held in a predetermined positional relationship and can be adjusted readily for the optical axis. Further, as the opposite end faces 32a and 32b of the cylindrical member 32 to which portions of the polarizers 20 and 22 on the polarizing separating film 4 side should be adhered are formed in an inclined relationship with respect to the optical axis, the incident angle of light to the polarizing separating film can be readily set to a large angle (for example, to 70 degrees). In the present example, the opposite end faces 32a and 32b of the cylindrical member 32 are formed in such a positional relationship that they are moved in parallel in the direction of the optical axis and rotated by 45 degrees around the optical axis relative to each other. Accordingly, only if the polarizers 20 and 22 are fixed by adhesion to the opposite end faces 32a and 32b of the cylindrical member 32 which have an elliptic shape, then the polarization plane of polarized light which passes through the light source side polarizer 20 can make an angle of 45 degrees with respect to the polarization plane of polarized light which passes through the light transmission path side polarizer 22. The permanent magnet for applying a magnetic field to the Faraday rotator 18 may be, for example, of a cylindrical configuration such that such permanent magnet may be secured along an outer periphery of the cylindrical member 32. It is to be noted that, in FIG. 17, one of the opposite end faces of the cylindrical member 32 is not rotated by 45 degrees with respect to the other end face in order to assure clear illustration of the figure.

Figure 18:
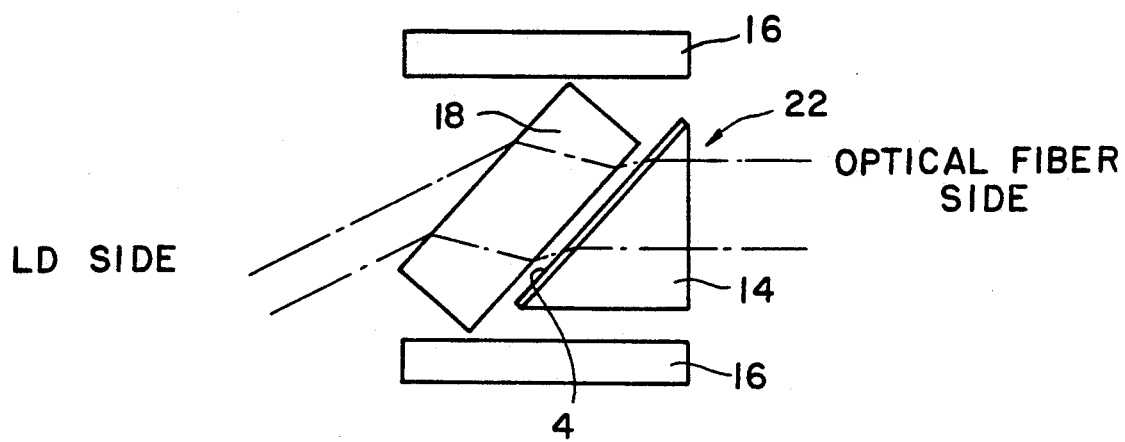
FIG. 18 is a view showing a basic construction of an optical isolator which is suitable to further reduce the overall size of the optical isolator of FIG. 14.

Referring to FIG. 18, a basic construction of an optical isolator which is suitable to further reduce the overall size is shown, and in the present device, the light source side polarizer in the optical isolator shown in FIG. 14 is omitted. In the present device, various members (including a light source) are disposed such that a polarization plane of parallel light from a semiconductor laser side is rotated by a Faraday rotator 18 an the rotated light is passed through a light transmission path side polarizer 22 with a low loss. Of reflected returning light from an optical fiber side, polarized light which has passed through the light transmission path side polarizer 22 is rotated in polarization plane by 45 degrees by the Faraday rotator 18 to make polarized light which has a polarization plane perpendicular to the polarization plane of light from the semiconductor laser. The reason why a function as an optical isolator is attained by the construction from which the light source side polarizer is omitted depends upon the following fact. In particular, emergent light of a semiconductor laser generally makes substantially linearly polarized light, and the intensity of a polarized light component having a polarization plane perpendicular to the polarization plane of the emergent light is sufficiently low. Further, it is known that, in case the reflected returning light which returns to the semiconductor laser is linearly polarized light having a polarization plane perpendicular to the polarization plane of the emergent light, that is, in case the reflected returning light does not have a polarized light component of the emergent light, there is little influence of such reflected returning light upon the semiconductor laser. Accordingly, even the construction from which the light source side polarizer is omitted can remove a polarized light component having the same polarization plane as the polarization plane of emergent light from a light source can be removed from the reflected returning light, and an unstable operation of the semiconductor laser can be prevented.

Figure 19:
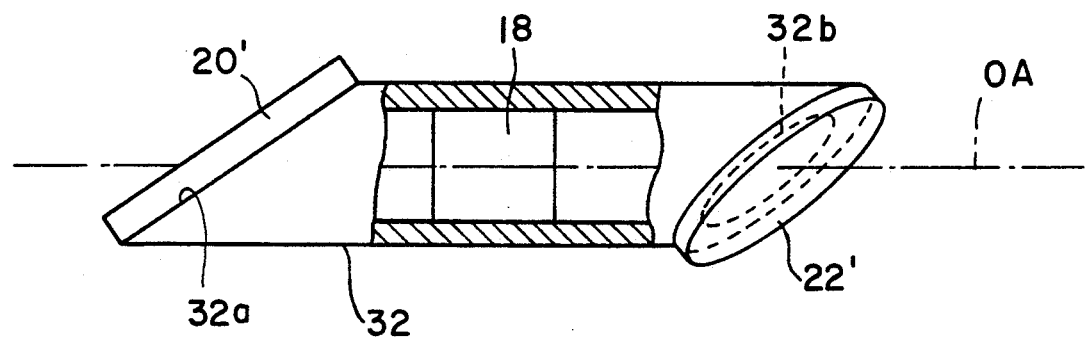
FIG. 19 is a side elevational view, partly broken, of an optical isolator for explaining means for fixedly holding components of the optical isolator in a predetermined positional relationship.

Referring now to FIG 19, means for fixedly holding components of an optical isolator in a predetermined positional relationship will be described. The optical isolator is constituted such that a light source side polarizer 20', a Faraday rotator 18 and a light transmission path side polarizer 22' are disposed in this order on an optical axis OA. The Faraday rotator 18 is secured in the inside of a cylindrical member 32. An end face 32a of the cylindrical member 32 is formed in an inclined relationship by a predetermined angle with respect to the optical axis OA. The other end face 32b of the cylindrical member 32 is formed on a plane obtained by rotating a plane parallel to the end face 32a by 45 degrees around the optical axis OA. The light source side polarizer 20' and the light transmission path side polarizer 22' are secured to the end face 32a and the other end face 32b of the cylindrical member 32, respectively. It is to be noted that the direction of rotation when the plane parallel to the end face 32a is rotated by 45 degrees around the optical axis OA depends upon the direction of optical rotation of the Faraday rotator 18.

The polarizers 20' and 22' may be constructed each using a polarizing separating film or otherwise may be constructed each using a birefringent crystal of rutile or the like. With the construction described above, only if the light source side polarizer 20' and the light transmission path side polarizer 22' are secured to the end faces of the cylindrical member 32, then a predetermined positional relationship among them is satisfied. Accordingly, where the polarizers 20' and 22' are each formed from a birefringent prism, their adjustment in orientation along the optic axis is unnecessary, but where the polarizers 20' and 22' are each formed using a polarizing separating film, their adjustment in position is unnecessary.

Figure 20:
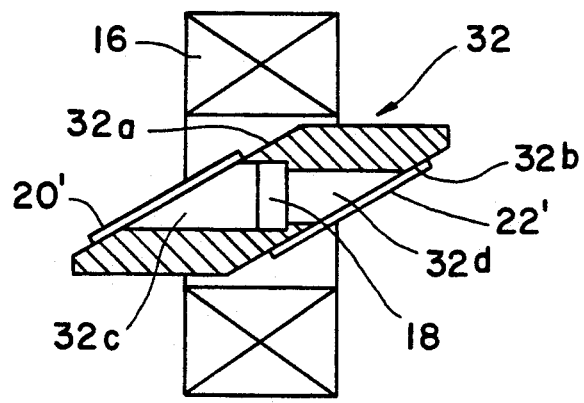
FIG. 20 is a sectional view of an optical isolator showing a detailed embodiment of the means of FIG. 19.

A detailed embodiment of the means of FIG. 19 will be described with reference to FIG. 20. Reference numeral 16 denotes a permanent magnet of a hollow cylindrical configuration, and a cylindrical member 32 having an end face 32a and the other end face 32b formed in a predetermined positional relationship thereon is held in the inside of the permanent magnet 16. It is to be noted that one of the opposite end faces of the cylindrical member 32 is not shown in a position rotated by 45 degrees relative to the other end face in order to assure clear illustration of the figure. A large diameter hollow portion 32c and a small diameter hollow portion 32d extend in an axial direction through the inside of the cylindrical member 32, and the Faraday rotator 18 is inserted in and secured to the large diameter hollow portion 32c. A light source side polarizer 20' and a light transmission path side polarizer 22' which may be formed, for exmaple, from such a polarizer as shown in FIG. 10 are secured by adhesion to the end faces 32a and 32b of the cylindrical member 32, respectively, such that they may be inclined by a predetermined angle with respect to an optical axis of the optical isolator (which is parallel, for example, to the axis of the cylindrical member 32). The polarizers 20' and 22' may each have the open structure wherein, for example, TiO$_2$ and SiO$_2$ are alternately layered on a flat glass plate. Generally, in order to cause a polarizer of the open construction to function well, it is necessary to set the incident and emergent angles to large values. However, according to the present construction, if the angles of the opposite end faces of the cylindrical member 32 with respect to the optical axis are set to an optimum angle, then it is possible to provide an optical isolator wherein the transmissivity of light in a forward direction is high but the transmissivity of light in the opposite direction is very low. Further, where a polarizing separating film of the open construction is employed, a polarizer and an analyzer can be constructed in a small size, and accordingly, the entire device can be constructed in a small size.

INDUSTRIAL APPLICABILITY

As described so far, since a polarizing separating device according to the present invention can be reduced in minimum necessary area of a polarizing separating film while maintaining a wide wavelength band for obtaining a predetermined extinction ratio, it is useful as a component of an optical device such as an optical isolator for which reduction in overall size and in production cost is required. Further, since an optical isolator according to the present invention can effectively eliminate reflected returning light to a semiconductor laser, it is useful where an optical communication system is constructed using a semiconductor laser as a light source.

We claim:

1. A polarizing separating device for separating a parallel light beam comprising:
   a transmission substrate having transmission faces; and
   a polarizing separating film formed on one of said transmission faces and including a plurality of an odd number of layers including a plurality of odd-numbered $SiO_2$ layers and a plurality of even-numbered $TiO_2$ layers, and wherein
   said one of said transmission faces on which said polarizing separating film is formed is inclined with respect to the other transmission face;
   a wavelength of the light beam equals $\lambda$, a thickness of a first layer of said layers which directly contacts with said transparent substrate and an uppermost layer of said layers farthest from said transparent substrate is set smaller than $\lambda/8$ while a center layer is set greater than $3\lambda/8$, but not including $\lambda/2$.

2. A polarizing separating device according to claim 1, wherein said transparent substrate includes a glass prism having a triangular pole configuration.

3. A polarizing separating device according to claim 1, wherein said polarizing separating film comprises:
   a plurality of $SiO_2$ layers; and
   a plurality of $TiO_2$ layers alternately formed on said transparent substrate.

4. A polarizing separating device according to claim 1, wherein an incident angle of light to said polarizing separating film is about 70 degrees.

5. A polarizing separating device according to claim 1, wherein the thickness of the first layer of said layers which directly contacts with said transparent substrate and the uppermost layer of said layers farthest from said transparent substrate is set between $\lambda/20$ and $\lambda/8$, while the center layer is set between $3\lambda/8$ to $5\lambda/8$ but not equal to $\lambda/2$.

6. A polarizing separating device according to claim 5, wherein an incident angle of light of said polarizing separating film is about 70 degrees.

7. A polarizing separating device according to claim 1, further comprising: a Faraday rotator formed on said one of said transmission faces of said polarizer on which said polarizing separating film is formed.

8. A polarizing separating device according to claim 1, further comprising:
   a second transparent substrate; a second polarizing separating film formed on said second transparent substrate; opposite to said polarizing separating film of said transparent substrate; and
   a Faraday rotator interposed between said transparent substrate and said second transparent substrate.

9. A polarizing separating device, comprising:
   a transparent substrate; and
   a polarizer including $SiO_2$ layers and $TiO_2$ layers alternately layered on said transparent substrate each odd-numbered layer is formed from $SiO_2$ while each even-numbered layer is formed from $TiO_2$ including an odd number of layers including a first layer, a second layer and a third layer, each having a thickness, as a whole; and
   where a wavelength of light is $\lambda$:
   the thickness of the first layer which directly contacts with said transparent substrate and the thickness of the uppermost layer farthest from said transparent substrate are set between $\lambda/20$ and $\lambda/8$;
   while the thickness of the center layer is set to a value between $3\lambda/8$ to $5\lambda/8$, but not equal to $\lambda/2$.

10. A polarizing separating device according to claim 9, wherein an incident angle of light to said polarizing separating film is a value ranging from 65 degrees to 75 degrees.

11. A polarizing separating device according to claim 9, wherein a thickness of each of said layers other than said first layer, said uppermost layer and said center layer ranges from $3\lambda/20$ to $\lambda/4$.

12. An optical isolator, comprising:
   a cylindrical member having opposite end opening inclined by a predetermined angle with respect to the optical axis, a Faraday rotator securely held in said cylindrical member
   a light transmission path side polarizer secured to an opening of said cylindrical member;
   a light source side polarizer secured to an opposite opening of said cylindrical member and having the same construction as said light transmission path side polarizer and provided on the other side to form said light transmission path side polarizer with respect to said Faraday; and
   a magnet,
   said light transmission path side polarizer and said light source side polarizer includes:
   a transparent substrate;
   a polarizing separating film formed on a side of said transparent substrate which faces said Faraday rotator, and
   a face of said transparent substrate on the side on which said polarizing separating film is formed is inclined with respect to another face of said transparent substrate;
   wherein a polarization plane of light which passes through said light source side polarizer makes an angle of 45 degrees with respect to a polarization plane of light which passes through said light transmission path side polarizer.

13. An optical isolator according to claim 12, wherein a polarization plane of light from a light source makes an angle of 45 degrees with respect to a polarization plane of light which passes through said light transmission path side polarizer such that the light from said light source may be optically rotated by said Faraday rotator and pass through said light transmission path side polarizer.

14. An optical isolator according to claim 12, wherein said Faraday rotator is inclined with respect to an optical axis.

15. An optical isolator according to claim 12, wherein the opposite end faces of said cylindrical member have a positional relationship so that they are moved in parallel in a direction of the optical axis relative to each other and rotated by 45 degrees around the optical axis relative to each other.

* * * * *

UNITED STATES PATENT AND TRADEMARK OFFICE
CERTIFICATE OF CORRECTION

PATENT NO. : 5,076,675
DATED : December 31, 1991
INVENTOR(S) : Kusaka et al.

It is certified that error appears in the above-identified patent and that said Letters Patent is hereby corrected as shown below:

Col. 13, (claim 1), line 6, change

"transmission" to --transparent--.

Signed and Sealed this

Eleventh Day of May, 1993

Attest:

MICHAEL K. KIRK

*Attesting Officer*   *Acting Commissioner of Patents and Trademarks*